US011986127B2

(12) United States Patent
Fries (10) Patent No.: US 11,986,127 B2
(45) Date of Patent: May 21, 2024

(54) GRINDING MILL HAVING CONVEXLY CURVED MILLING PROJECTIONS

(71) Applicant: JOMA KUNSTSTOFFTECHNIK GMBH, Brunn am Gebirge (AT)

(72) Inventor: Rudolf Fries, Kaumberg (AT)

(73) Assignee: JOMA KUNSTSTOFFTECHNIK GMBH, Brunn am Gebirge (AT)

(*) Notice: Subject to any disclaimer, the term of this patent is extended or adjusted under 35 U.S.C. 154(b) by 473 days.

(21) Appl. No.: 17/292,936

(22) PCT Filed: Dec. 18, 2019

(86) PCT No.: PCT/AT2019/060440
§ 371 (c)(1),
(2) Date: May 11, 2021

(87) PCT Pub. No.: WO2020/124114
PCT Pub. Date: Jun. 25, 2020

(65) Prior Publication Data
US 2022/0000313 A1    Jan. 6, 2022

(30) Foreign Application Priority Data

Dec. 18, 2018  (AT) .............................. A 51128/2018

(51) Int. Cl.
A47J 43/10     (2006.01)
A47J 42/10     (2006.01)
A47J 42/40     (2006.01)

(52) U.S. Cl.
CPC ............... *A47J 42/10* (2013.01); *A47J 42/40* (2013.01)

(58) Field of Classification Search
CPC .............. A47J 42/10; A47J 42/02; A47J 42/04
See application file for complete search history.

(56) References Cited

U.S. PATENT DOCUMENTS

| 5,865,384 A * | 2/1999 | Pai .......................... A47J 42/02 |
| | | 241/101.3 |
| 6,196,481 B1 * | 3/2001 | Barbagli ................. A47J 42/10 |
| | | 241/169.1 |
| 6,224,005 B1 * | 5/2001 | Wu .......................... A47J 42/10 |
| | | 241/169.1 |

(Continued)

FOREIGN PATENT DOCUMENTS

| DE | 20 2006 004 568 | 6/2006 | |
| DE | 102016101839 A1 * | 8/2017 | .............. A47J 31/42 |
| EP | 2 474 256 | 7/2012 | |

OTHER PUBLICATIONS

Int'l Search Report (Form PCT/ISA/210) conducted in Int'l Appln. No. PCT/AT2019/060440 (dated Feb. 26, 2020).

(Continued)

*Primary Examiner* — Faye Francis
(74) *Attorney, Agent, or Firm* — GREENBLUM & BERNSTEIN, P.L.C.

(57) ABSTRACT

A grinding mill or seasoning grinder for grinding seasonings includes a stator and a rotatably mounted rotor having a base body with a shape of a truncated cone, where the rotor concentric to the stator. The stator and the rotor each include milling projections which are, at least in some sections, convexly curved in cross-section and the surfaces of milling projections are devoid of discontinuities that include edges or undercuts.

19 Claims, 5 Drawing Sheets

(56) References Cited

U.S. PATENT DOCUMENTS

| | | | | |
|---|---|---|---|---|
| 6,378,794 B1* | 4/2002 | Wu | ............... | A47J 42/10 |
| | | | | 241/168 |
| 7,604,192 B2* | 10/2009 | Tang | ............... | A47J 36/02 |
| | | | | 241/169.1 |
| 9,578,989 B2* | 2/2017 | Lægdsgaard | ............... | A47J 42/08 |
| 10,413,127 B1* | 9/2019 | Jana | ............... | A47J 42/38 |
| 2012/0006922 A1* | 1/2012 | Wilson | ............... | A47J 42/08 |
| | | | | 241/293 |
| 2016/0015214 A1* | 1/2016 | Lægdsgaard | ............... | A47J 42/10 |
| | | | | 241/257.1 |
| 2016/0045070 A1* | 2/2016 | Sahli | ............... | A47J 42/00 |
| | | | | 241/257.1 |
| 2017/0258272 A1* | 9/2017 | Pai | ............... | A47J 42/02 |
| 2017/0319009 A1 | 11/2017 | Seckel et al. | | |

OTHER PUBLICATIONS

Int'l Written Opinion (Form PCT/ISA/237) conducted in Int'l Appln. No. PCT/AT2019/060440 (dated Feb. 26, 2020).

* cited by examiner

GRINDING MILL HAVING CONVEXLY CURVED MILLING PROJECTIONS

The invention relates to a grinding mill for grinding seasonings, particularly salt, having a stator and a rotatably mounted rotor which is concentric to the stator.

The invention also relates to a seasoning grinder for grinding seasonings, particularly salt, having a container for the seasoning.

Grinding mills of this type have been known from the prior art for a long time and typically have sharp-edged cutting teeth on the rotor and/or on the stator, with which cutting teeth the seasoning, also referred to below as milling material, is cut up and thereby comminuted. For some seasonings, for example pepper, cutting up the milling material has the advantage that the flavours in the milling material are retained for a longer period. In the case of hard seasonings, however, it has been found that the cutting teeth wear down relatively quickly, and the abraded material produced is conveyed together with the seasoning out of the grinding mill and ultimately lands on the food.

It has also been found that, when hard seasonings are used, the grain size of the milled seasoning cannot be kept constant, since the cutting teeth are worn down more and more over time by the milling material and are blunted as a result.

A grinding mill of the aforementioned type is disclosed, inter alia, in EP 2 474 256 A1. Both the rotor and the stator have elongate, sharp-edged cutting teeth, with the aid of which the milling material is cut up and thereby comminuted. When hard seasonings such as salt are used, the cutting teeth are disadvantageously worn down quickly, as explained above, as a result of which the grain size of the milled salt changes over time and the abraded material lands in the food together with the milled seasoning.

The object of the present invention is therefore that of moderating or overcoming the disadvantages of the prior art. In particular, the object of the present invention is that of creating a grinding mill with which abrasion of the rotor and stator during the milling of hard seasonings is minimised or avoided without reducing the throughput of the milling material.

This object is achieved in that the stator and the rotor have milling projections which are, at least in some sections, convexly curved in cross-section and the surfaces of which are devoid of discontinuities. Owing to such a design of the milling projections, the seasoning is crushed when the rotor rotates.

Therefore, according to the invention, convexly curved milling projections, the surfaces of which are devoid of discontinuities, are provided instead of cutting teeth as are conventional in the prior art. It has specifically been found that sharp-edged cutting teeth in the grinding mill are not necessary, in particular for comminuting seasonings having a crystalline structure such as salt, since such seasonings have, owing to their structure, predetermined breaking points along which the crystal microstructure breaks when pressure is applied. It is therefore sufficient merely to exert pressure on crystalline or mineral seasonings with the aid of blunt surfaces, such as the milling projections according to the invention, as a result of which said seasonings break into small pieces by themselves. Of course, seasonings other than salt, in particular rock salt, or pepper can also be broken up or crushed by the blunt milling projections. Discontinuities in particular mean sudden changes in the cross-sectional profile of the surface of a milling projection. In the grinding mill according to the invention there are no discontinuities such as sharp edges, acute-angled undercuts or pointed projections on the surfaces coming into contact with the milling material, which are usually worn down over time in the prior art. As a result, the abrasion during milling can be reduced or even avoided altogether without reducing the milling throughput. The grinding mill according to the invention is characterised in particular by an increased resistance to wear and a longer service life.

Expressions such as "top" and "bottom" and variations thereof relate to the intended use state of the grinding mill. The unmilled milling material or seasoning enters the grinding mill "at the top", and the ground milling material or seasoning then exits the grinding mill again "at the bottom".

The milling projections according to the invention are convexly curved at least in some sections, i.e. outwardly bulging at least in some sections, in cross-section without forming corners. It is essential that the milling projections do not have any pointed edges, projections or undercuts, but instead have smooth surfaces. In one embodiment, the milling projections are convexly curved over the entire cross-section without forming pointed edges, projections or undercuts. In the grinding mill according to the invention, both the rotor and the stator have the milling projections according to the invention, and different shapes of milling projections can be provided on the rotor and on the stator. Different types of milling projections with different shapes can also be provided on the same unit (rotor and stator). So that the shape of the milling projections is retained in the long term, they preferably consist of polyoxymethylene (POM); alternatively, production from polycarbonate (PC), polyethylene terephthalate (PET), polystyrene (PS), polymethylmethacrylate (PMMA), polyacrylonitrile butadiene styrene (ABS), polylactide (PLA) or other suitable plastics is also conceivable. In particular, the rotor and/or the stator and/or the milling projections can be manufactured from the same material.

In a preferred embodiment, the rotor is arranged inside the stator (inner rotor). Alternatively, the rotor can be arranged on the outside, around the stator (outer rotor). In both cases, a circumferential gap is always provided between the rotor and the stator so that the rotor can rotate. While the rotatably mounted rotor is rotated, the milling projections of the rotor slide past the milling projections of the stator. When a milling projection of the stator is opposite a milling projection of the rotor, the gap is reduced at this point, as a result of which milling material therebetween is crushed. The width of the gap accordingly varies over the circumference. It is important that there is always a gap between the rotor and the stator so that the rotor can rotate and the milling material passes through the grinding mill. The rotor and the stator each have a base surface on which the milling projections are arranged. In a hollow cylindrical stator, the base surface is the inner face. In a (truncated) cone-shaped or cylindrical rotor, the base surface is the lateral surface. In the outer rotor variant, this is correspondingly reversed.

In a preferred embodiment, the cross-sections of the milling projections are convexly curved at least in some sections along the entire longitudinal extent of the milling projections. Accordingly, the milling projections preferably have an elongate shape and are convex in cross-section at least in some sections over the entire length, in a preferred embodiment even in the entire cross-section. The elongate milling projections can be oriented parallel. The longitudinal axis of the milling projections preferably points substantially in the same direction as the longitudinal axis of the rotor or of the stator.

To reduce abrasion still further, it is favourable if the grinding mill has an inlet side and an outlet side for the seasoning, and the end faces of the milling projections facing the inlet side are convexly curved. The seasoning introduced into the grinding mill via the inlet side thus meets convexly curved end faces which are free from pointed edges, corners and acute-angled undercuts. The inlet side of the grinding mill means the side on which the unmilled seasoning enters the grinding mill. Usually, the grinding mill is connected to a container on the inlet side via a housing.

To allow the rotor to rotate and to promote throughput of the seasoning through the grinding mill, it has proven advantageous if the rotor and the stator are arranged such that the milling projections of the rotor are spaced from the milling projections of the stator, in particular spaced by at least 0.1 mm, at all times during rotation of the rotor. This does not mean that the distance between the milling projections of the rotor and the milling projections of the stator has to be constant. But there is no direct contact between the milling projections of the rotor and those of the stator at any point. Depending on the shape of the rotor and the stator, the distance can vary along the circumference of the stator and of the rotor and in the longitudinal direction thereof.

It is favourable when the cross-sections of the milling projections of the stator are circular segments with a radius in a range between 0.1 mm and 70 mm, preferably between 0.15 mm and 60 mm, even more preferably between 0.2 mm and 50 mm. Preferably, the radii of the circular segments are between 0.5 mm and 6 mm, even more preferably between 0.8 mm and 5 mm. These values have proven particularly favourable with regard to a minimisation of the abrasion without reduction of the ground amount. The radius of the circular segment relates to the circular arc. In the prior art, grinding mills usually have sharp-edged teeth with radii under 0.1 mm and therefore cut up the seasoning during grinding. In the grinding mill according to the invention, however, the seasonings are crushed. The milling projections of the stator can each have cross-sections which are different from each other. Groups with the same cross-sections can also be provided. It is important in this embodiment only that the cross-sections are circular segments, i.e. sections of a circle. The cross-sections of the milling projections of the stator are preferably circular segments substantially over their entire length.

To avoid the unground seasoning becoming wedged, it can be advantageous if the stator is divided into a region for coarse grinding with first stator milling projections and a region for fine grinding with second stator milling projections, the first stator milling projections preferably being spaced from each other in the region for coarse grinding. Owing to the spacing between the first stator milling projections, coarse grinding of the seasoning takes place first. The region for fine grinding preferably directly adjoins the region for coarse grinding. Of course, further regions can be provided as a transition for finer grading between the region for coarse grinding and the region for fine grinding. In the region for fine grinding, the second stator milling projections are arranged more closely together than the first stator milling projections in the region for coarse grinding. Preferably, the second stator milling projections directly adjoin each other or merge into each other.

All the milling projections on the stator have a maximum height from the base surface of the stator, and said height corresponds to the radius in stator milling projections with cross-sections which are circular segments. The ratio of the maximum height of the first stator milling projections to the maximum height of the second stator milling projections is preferably in the range between 1:0.25 and 1:2, in particular 1:1.2.

The first and/or second stator milling projections can also be inclined to the base surface, preferably in the longitudinal direction.

For a particularly high milling throughput, it has proven favourable if the ratio of the number of first stator milling projections to the number of second stator milling projections is in the range between 1:1 and 1:15, preferably between 1:1 and 1:10, in particular 1:2. Accordingly, the number of second stator milling projections is at least as high as the number of first stator milling projections. Preferably, the number of second stator milling projections is higher than the number of first stator milling projections. As a result, a finer grinding of the seasoning takes place in a virtually stepwise manner.

In a preferred embodiment, the rotor has a base surface 59 and is divided into a region for coarse grinding with first rotor milling projections and a region for fine grinding with second rotor milling projections, the first rotor milling projections preferably being spaced from each other in the region for coarse grinding. It is particularly favourable, as long as the stator is also divided, if the region for coarse grinding of the rotor interacts with the region for coarse grinding of the stator. The same applies to the regions for fine grinding. Of course, further regions can be provided as a transition for finer grading between the region for coarse grinding and the region for fine grinding.

All the milling projections on the rotor have a maximum height from the base surface of the rotor. The ratio of the maximum height of the first rotor milling projections to the maximum height of the second rotor milling projections is preferably in the range between 1:0.25 and 1:2, in particular 1:1.3.

The first and second rotor milling projections can also be inclined to the base surface, preferably in the longitudinal direction.

The ratio of the number of first rotor milling projections to the number of second rotor milling projections can be in the range between 1:1 and 1:15, preferably between 1:1 and 1:10, in particular 1:3. Accordingly, the number of second rotor milling projections is at least as high as the number of first rotor milling projections. Preferably, the number of second rotor milling projections is higher than the number of first rotor milling projections. As a result, a finer grinding of the seasoning takes place in a virtually stepwise manner.

To promote the gentlest possible fine grinding, it is advantageous if the cross-sections of the second rotor milling projections have a substantially evenly rising section and a convexly curved falling section. The rotation direction of the rotor for milling is then such that the convexly curved falling sections are first in the rotation direction. The substantially evenly rising section adjoins the convexly curved falling section. The gradient of the substantially evenly rising section is substantially linear.

In addition, the first rotor milling projections can each have a flat section and two opposing convexly curved flanks adjacent to the flat section. The flat section is free of curvature.

It is advantageous if the convexly curved flanks enclose, in the transition region between the convexly curved flanks and the base surface of the rotor, an angle of less than 90° with the base surface within the first rotor milling projections. In other words: The angle enclosed by the slopes of the convexly curved flanks with the base surface in the transition to the base surface (that is, the tangents thereof in said transition) is below 90°, so that no acute-angled undercuts are produced.

To guide the milling material during rotation of the rotor, it is favourable if the milling projections of the rotor are skewed helically around a longitudinal axis of the rotor. The skew can be 0°-90°, preferably at least 10°, in particular 65°, about the longitudinal axis.

If separate regions for coarse grinding and fine grinding are present, a gentler transition between the regions can be achieved if the rotor tapers conically from a lower side to an upper side. The upper side faces the inlet side, and the lower side faces the outlet side of the grinding mill. Accordingly, the rotor in this embodiment has substantially (except for the milling projections) the shape of a truncated cone, the bottom face of which with the larger diameter faces the outlet side and thus corresponds to the lower side. Owing to the truncated cone shape, the milling material is conveyed during milling into a narrower and narrower gap between the stator and the rotor and crushed. Of course, the stator can also taper conically from one side to the other to produce a gap becoming narrower and narrower. In a particularly preferred embodiment, the stator has the shape of a hollow cylinder, and the rotor has the shape of a truncated cone.

Preferably, in the transition region to the base surface of the rotor, in particular when viewed from the lower side of the rotor, the substantially evenly rising section encloses an angle $\alpha$ with a tangent on the base surface, said angle being at most 90°, particularly preferably at most 45°, even more preferably at most 20°, counting in the mathematically positive direction away from the tangent on the base surface. In other words, the surface of the evenly rising section forms the angle $\alpha$ with the underlying tangent on the base surface. The tangent is tangent to the base surface in the transition region between the evenly rising section and the base surface.

Furthermore, it is favourable if, in the transition region to the base surface of the rotor, in particular when viewed from the lower side of the rotor, the convexly curved falling section spans an angle $\beta$ with a tangent on the base surface, said angle being at least 90°, particularly preferably at least 100°, even more preferably at least 120°, but at most 180°, counting in the mathematically positive direction away from the tangent on the base surface. The tangent is tangent to the base surface in the transition region between the curved falling section and the base surface. In contrast to the angle $\alpha$, the angle $\beta$ is formed by the surface of the base surface and the surface of the curved falling section virtually outside the second rotor milling projection. Since the convexly curved section is curved, the angle $\beta$ is likewise counted relative to a tangent on the convexly curved section in the transition region to the base surface.

Preferably, the smallest curvature of the cross-sections of the milling projections of the stator and/or of the rotor has a radius of curvature R of at least 0.5 mm, even more preferably at least 0.6 mm, at least 0.7 mm, at least 0.8 mm or at least 0.9 mm. In other words, the milling projections are free of edges, corners, points or projections with radii of curvature less than 0.5 mm, 0.6 mm, 0.7 mm, 0.8 mm or 0.9 mm.

To minimise or completely avoid abrasion by the milling material, it is advantageous if the smallest curvature of the cross-sections of the milling projections has a radius of curvature R in a range between 0.1 mm and 70 mm, preferably between 0.15 mm and 60 mm, even more preferably between 0.2 mm and 50 mm or 1 mm and 20 mm. Accordingly, the cross-sections of the milling projections in any case have no edges, corners or projections with radii less than 0.1 mm, preferably less than 0.15 mm, even more preferably less than 0.2 mm. The end faces of all the milling projections facing the inlet side of the grinding mill also have no edges, corners or projections with radii less than 0.1 mm, preferably less than 0.15 mm, even more preferably less than 0.2 mm.

Furthermore, the aforementioned object is achieved by a seasoning grinder of the aforementioned type which has a grinding mill according to the above embodiments.

A particularly preferred embodiment of the present invention is described below using figures, but the invention is not intended to be limited thereto.

Expressions such as "top" and "bottom" and variations thereof relate to the intended use state of the grinding mill. The unmilled milling material or seasoning enters the grinding mill "at the top", and the ground milling material or seasoning then exits the grinding mill again "at the bottom".

In the figures, the individual parts of a grinding mill 15 according to the invention are sometimes shown separately. For the sake of clarity, a simplified presentation has been chosen for the figures, in which elements which do not contribute to understanding have been omitted.

Figure 1:
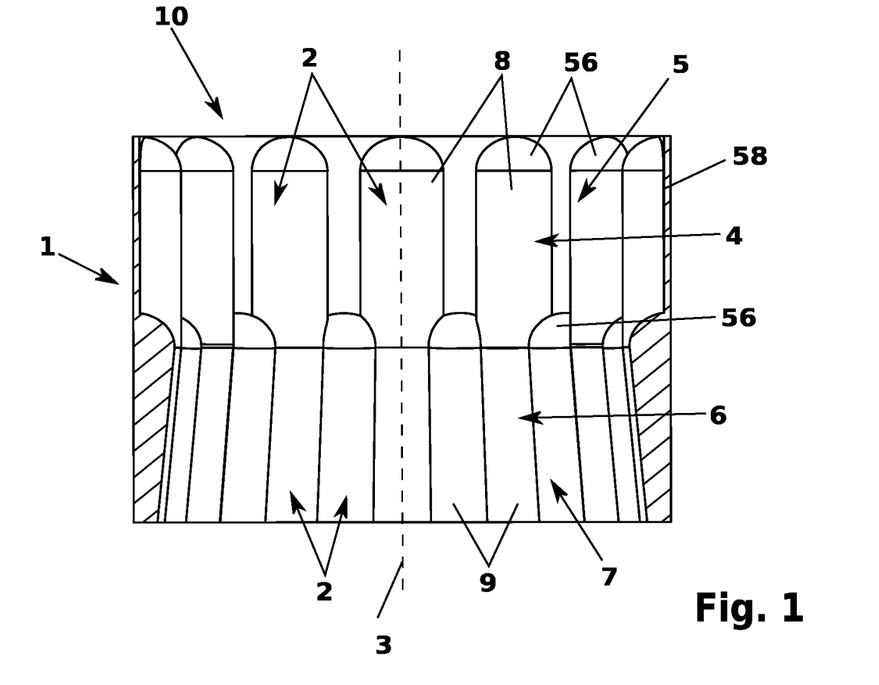
FIG. 1 shows a stator according to the invention in a longitudinal section.

FIG. 1 shows a longitudinal section through a stator 1 of a grinding mill 15 according to the invention (see FIG. 8) in the form of a hollow cylinder. The stator 1 has, on an inner side, a plurality of elongate, convexly curved milling projections 2, which are oriented in the direction of a longitudinal axis 3 of the stator 1 and extend over the entire length of the stator 1. The milling projections 2 of the stator are convexly curved in the entire cross-section along their entire longitudinal extent and do not form any acute-angled undercuts or sharp edges. The stator 1 is substantially divided into two sections. The upper section 4 forms a region 5 for coarse grinding, the lower section 6 forms a region 7 for fine grinding. In the region 5 for coarse grinding, the milling projections 2 are referred to as first stator milling projections 8. Correspondingly, the milling projections 2 in the region for fine grinding 7 are referred to as second stator milling projections 9. The first stator milling projections 8 are spaced from each other for coarse grinding, whereas the second stator milling projections 9 are directly adjacent to each other or merge into each other. In addition, the second stator milling projections 9 are inclined to a base surface 58 of the stator corresponding to the inner face of the hollow cylinder, so that the second stator milling projections 9 rise slightly in the direction of the first stator milling projections 8. Of course, the first stator milling projections 8 could also have an inclination relative to the base surface 58. Other inclinations or no inclinations at all are also possible.

Figure 2:
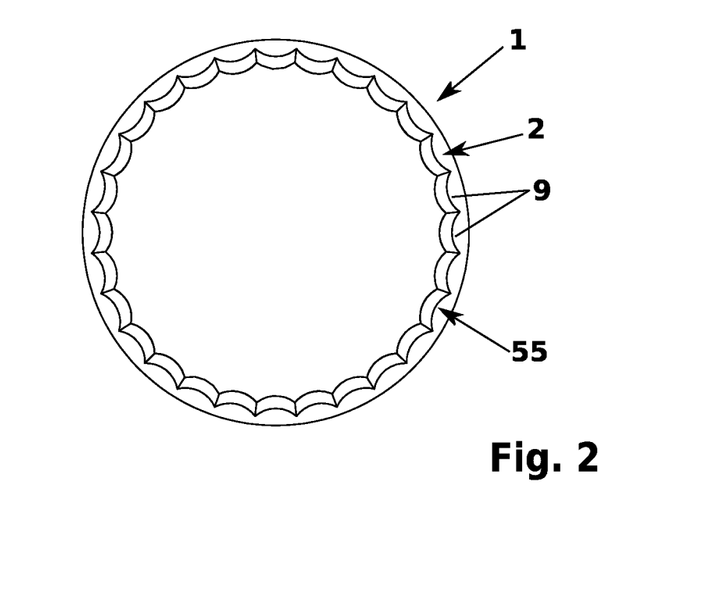
FIG. 2 shows a stator according to the invention in a view from below.
Figure 4:
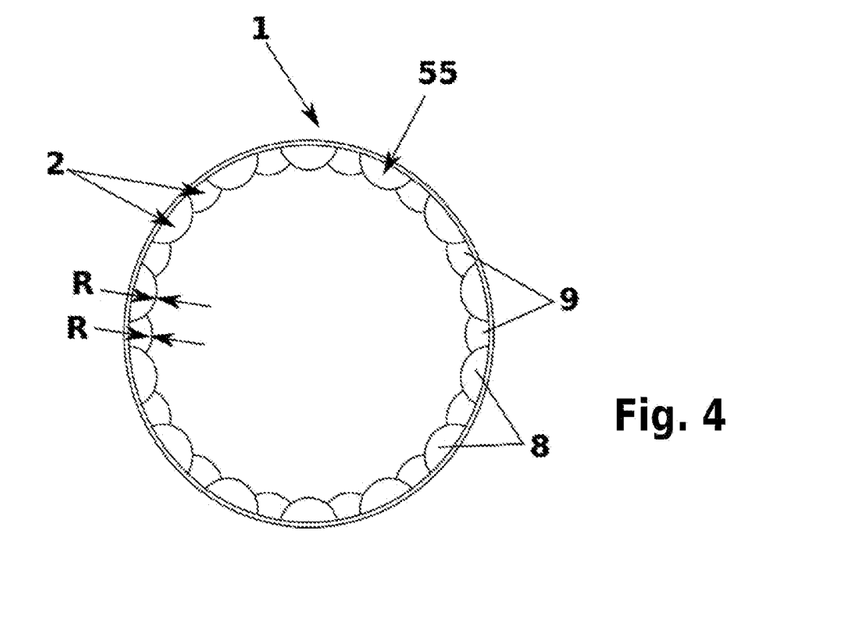
FIG. 4 shows a stator according to the invention in a view from above.

As can be seen in particular in FIG. 2 and FIG. 4, the cross-sections of the first 8 and second stator milling projections 9 are circular segments. This means that the cross-sectional area 55 of the first 8 and second stator milling projections 9 are circular segments, that is, portions of a circular area delimited by an arc and a chord. The radius R of the arc is in a range between 0.1 mm and 70 mm, preferably between 0.15 mm and 60 mm, even more preferably between 0.2 mm and 50 mm, between 0.9 mm and 5 mm, or, as in the embodiment shown, is 2 mm. The cross-sections of the first 8 and second stator milling projections 9 are substantially constant over their entire length.

Looking again at FIG. 1, it can be seen that the first stator milling projections 8 merge into the second stator milling projections 9. Furthermore, it can be seen that the ratio of the number of first stator milling projections 8 to the number of second milling projections is 1:2. That is, there are twice as many second stator milling projections 9 as first stator milling projections 8. However, a higher or lower ratio can also be provided, as long as the number of second stator milling projections 9 is at least as high as the number of first rotor milling projections 8. In cross-section, the first stator milling projections 8 form semi-circles, whereas the second stator milling projections 9 are smaller circular segments (see FIGS. 2 and 4). On the end faces 56 facing an inlet side 10, all the milling projections 2 of the stator 1 form a convex curvature in the form of a section of a surface of a sphere. The region 5 for coarse grinding is assigned to the inlet side 10 of the grinding mill 15.

Figure 3:
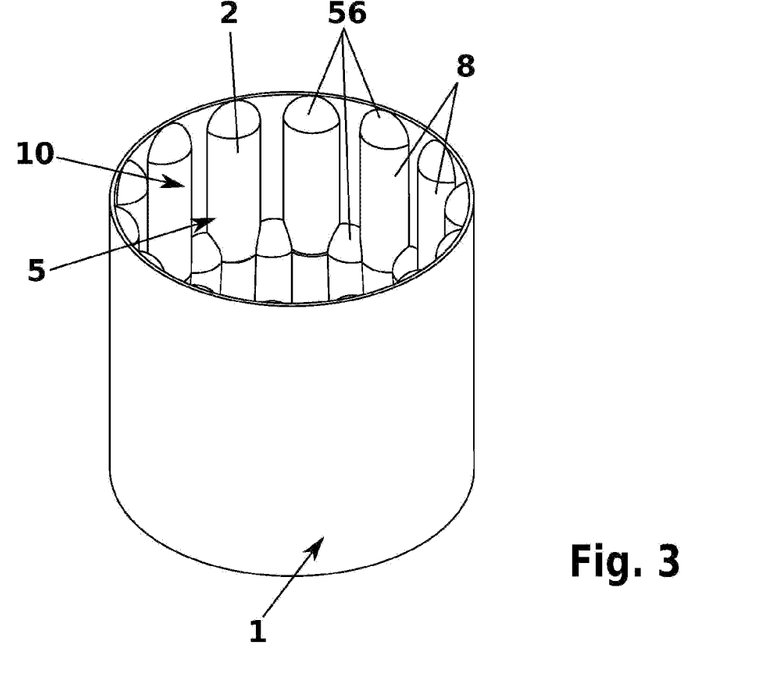
FIG. 3 shows a stator according to the invention in an oblique view from above.

FIG. 3 shows the stator 1 in an oblique view from above, that is, on the inlet side, in which the region 5 for coarse grinding is visible.

Figure 5:
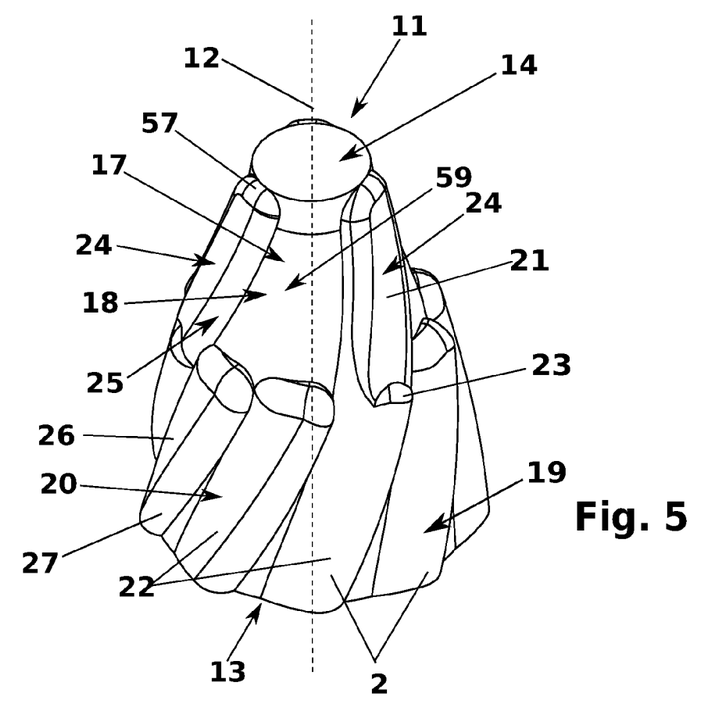
FIG. 5 shows a rotor according to the invention in an oblique view from above.

FIG. 5 shows a rotor 11 of substantially truncated cone shape in an oblique view from above. Similar to the stator 1, on the outside of the rotor 11 there are likewise elongate milling projections 2 which are convexly curved in some sections but which, in contrast to the milling projections 2 of the stator 1, are skewed helically around a longitudinal axis 12 of the rotor 11. The skew around the longitudinal axis in the shown embodiment is 65°. It can be seen that the rotor 11 tapers conically from a lower side 13 to an upper side 14. For example, the diameter of the upper side is approximately 9.75 mm, and the diameter of the lower side is 22.8 mm. In the assembled state of the grinding mill 15, the upper side 14 faces the inlet side 10, and the lower side faces an outlet side 16.

Like the stator 1, the rotor 11 is also divided into two sections. The upper section 17 is a region 18 for coarse grinding, the lower section 19 is a region 20 for fine grinding. In the region 18 for coarse grinding, the milling projections 2 are referred to as first rotor milling projections 21. Correspondingly, the milling projections 2 in the region for fine grinding 20 are referred to as second rotor milling projections 22. The first rotor milling projections 21 are spaced from each other for coarse grinding. The ratio of the number of first milling projections 21 of the rotor 11 to the number of second milling projections 22 of the rotor 11 is 1:3 but can also be higher or lower, as long as the number of second rotor milling projections 22 is at least as high as the number of first rotor milling projections 21.

Figure 7:
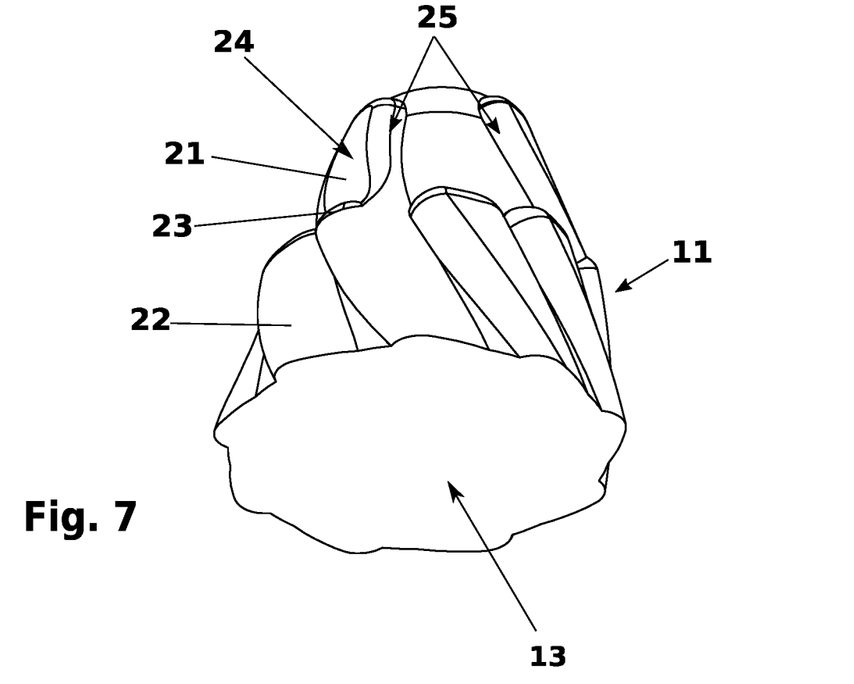
FIG. 7 shows a rotor according to the invention in an oblique view from below.

As can be seen in particular in FIG. 5 and FIG. 7, the first rotor milling projections 21 merge into the second rotor milling projections 22, and in the transition region a convexly curved edge 23 is formed, the radius of curvature of which is preferably at least 0.2 mm. In the places in which the second rotor milling projections 22 do not merge into first rotor milling projections 21, a convexly curved edge, i.e. blunt edge, is also formed. The first rotor milling projections 21 each have, in cross-section, a flat section 24 and two opposing convexly curved flanks 25 adjacent to the flat section. The convexly curved flanks 25 form an angle of at most 90° with the base surface 59 of the rotor, and therefore no acute-angled undercuts are produced. The base surface 59 corresponds to the lateral surface of the rotor without milling projections 2, that is, the lateral surface of a truncated cone. All the end faces 57 of the milling projections 2 of the rotor 11 facing towards the upper side 14 of the rotor 11 are likewise convexly curved to minimise abrasion.

Figure 6:
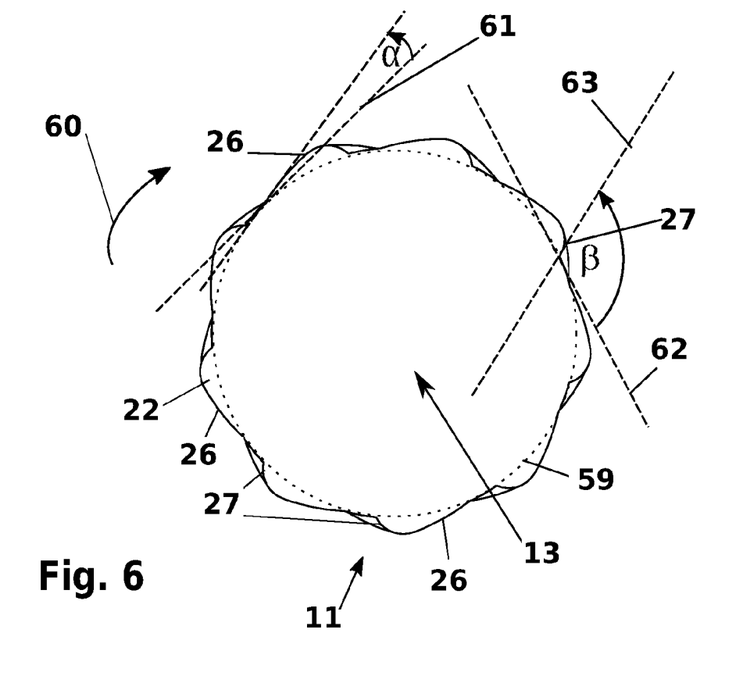
FIG. 6 shows a rotor according to the invention in a view from below.

As can be seen in FIG. 6, the cross-sections of the second rotor milling projections 22 have a substantially evenly rising section 26 and a convexly curved falling section 27. The rotation direction 60 of the rotor 11 for milling is such that the convexly curved falling sections are first in the rotation direction. Viewed from the lower side 13, the substantially evenly rising section 26 forms, at the base surface 59, an angle α with a tangent 61 on the base surface 59 of the rotor 11, said angle being at most 90°, particularly preferably at most 45°, in the embodiment shown 14°, counting in the mathematically positive direction away from the tangent 61. The tangent 61 is tangent to the base surface 59 in the transition region between the evenly rising section 26 and the base surface 59. The angle α lies virtually within the second rotor milling projection 22 between the surface of the rising section 26 and the tangent on the base surface 59. An imaginary extension of the evenly rising section 26 is shown with a dashed line for better illustration of the angle α. In the view from above shown in FIG. 6, the base surface 59 is indicated by means of a dashed circle.

Viewed from the lower side 13, the convexly curved falling section 27 forms, at the base surface 59, an angle β with a tangent 62 on the base surface 59 of the rotor 11, said angle being at least 90°, particularly preferably at least 110°, in the embodiment shown 122°, counting in the mathematically positive direction away from the tangent 62. The tangent 62 is tangent to the base surface 59 in the transition region between the convexly curved falling section 27 and the base surface 59. The angle β lies virtually in front of the section 27 in the rotation direction 60 and thus outside the second rotor milling projection 22 and is in a manner of speaking spanned by the base surface 59 and the surface of the section 27. Since the convexly curved falling section 27 is curved, the angle β is likewise counted relative to a tangent 63 on the convexly curved section 27 in the transition region to the base surface 59.

FIG. 7 shows the rotor 11 according to the invention in an oblique view from below. It can be seen that the first rotor milling projections 21 merge into the second rotor milling projections 22.

Figure 8:
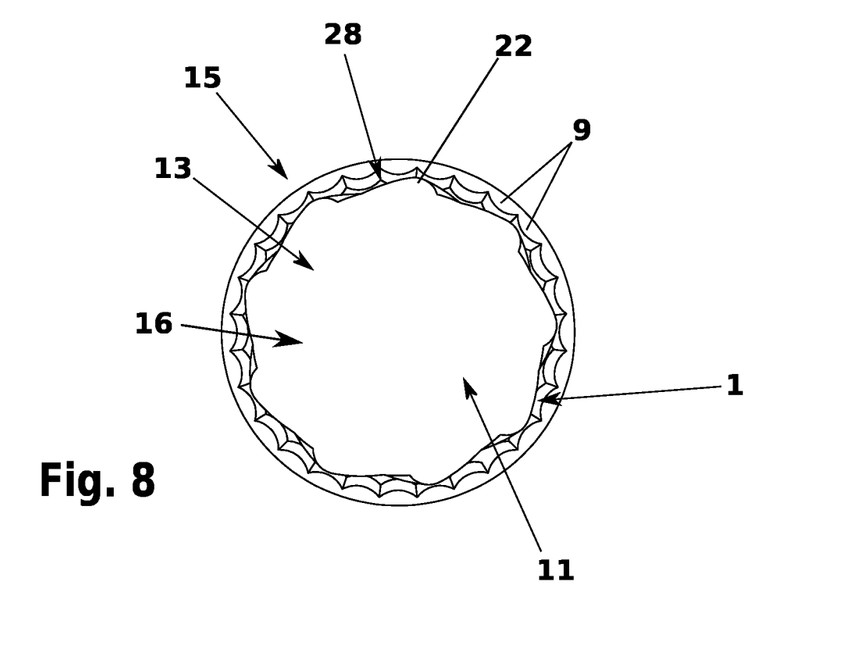
FIG. 8 shows a grinding mill according to the invention having a rotor and a stator in a view from below.
Figure 9:
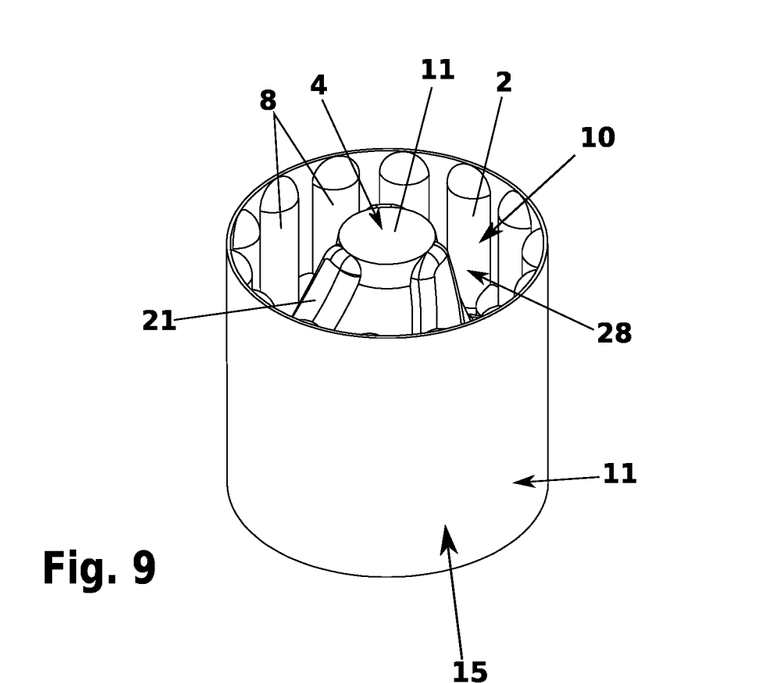
FIG. 9 shows a grinding mill according to the invention having a rotor and a stator in an oblique view from above.

FIG. 8 and FIG. 9 schematically show the assembled state of the grinding mill 15 according to the invention. All the connecting parts have been omitted for the sake of clarity. The rotor 11 is completely inserted into the stator 1. The rotor 11 is usually rotatably mounted (not visible). Between the rotor 11 and the stator 1 there is a gap 28, through which the milling material (not shown) passes from the inlet side 10 to the outlet side 16 and is crushed in the process. The gap 28 varies both spatially around the circumference and chronologically when the rotor 11 is set in rotation. The gap 28 also varies between the inlet side 10 and the outlet side 16 owing to the truncated cone shape of the rotor 11. In other words, the gap tapers increasingly from the inlet side 10 to the outlet side 16.

Figure 10:
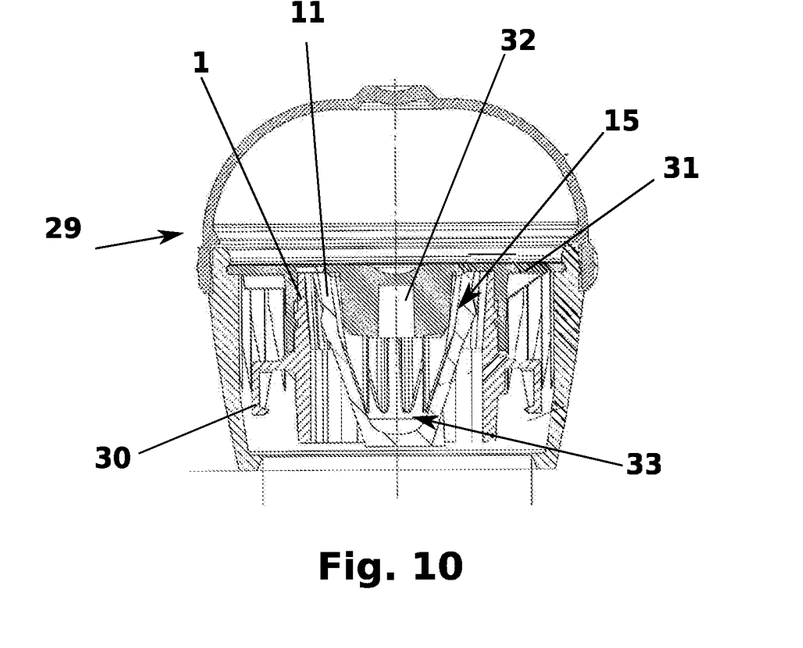
FIG. 10 shows a grinding mill according to the invention in cross-section in a housing.

FIG. 10 shows the grinding mill 15 according to the invention in cross-section. The grinding mill 15 is arranged inside a housing 29 and is connected to same via fasteners 30 in the form of latching noses. The rotor 11 is connected to the stator via a preferably perforated cap 31, the cap 31 having a centrally arranged bearing pin 32 which engages in a cut-out 33 in the rotor 11. The rotor 11 can rotate about the bearing pin 32 but is secured against displacement. The housing 29 also has connecting means, for example a thread, on one side for connection to a container (not shown) for seasonings.

The invention claimed is:

1. A grinding mill for grinding seasonings comprising:
a stator and
a rotatably mounted rotor having a base body with a shape of a truncated cone, the rotor being concentric to the stator,
wherein
the stator and the rotor each comprise milling projections which are, at least in some sections, convexly curved in cross-section and the surfaces of the milling projections are devoid of discontinuities that include edges or undercuts.

2. The grinding mill according to claim 1,
wherein
cross-sections of the milling projections are convexly curved at least in some sections along an entire longitudinal extent of the milling projections.

3. The grinding mill according to claim 1,
wherein
the grinding mill has an inlet side and an outlet side for the seasonings, and
end faces of the milling projections facing the inlet side are convexly curved.

4. The grinding mill according to claim 1,
wherein
the rotor and the stator are arranged such that the milling projections of the rotor are spaced from the milling projections of the stator at all times during rotation of the rotor.

5. The grinding mill according to claim 1,
wherein
cross-sections of the milling projections of the stator are circular segments with a radius in a range between 0.1 mm and 70 mm.

6. The grinding mill according to claim 1,
wherein
the stator is divided into a region for coarse grinding with first stator milling projections and a region for fine grinding with second stator milling projections.

7. The grinding mill according to claim 6,
wherein
a ratio of a number of the first stator milling projections to a number of the second stator milling projections is in a range between 1:1 and 1:15.

8. The grinding mill according to claim 1,
wherein
the rotor has a base surface and is divided into a region for coarse grinding with first rotor milling projections and a region for fine grinding with second rotor milling projections.

9. The grinding mill according to claim 8,
wherein
a ratio of a number of the first rotor milling projections to a number of the second rotor milling projections is in a range between 1:1 and 1:15.

10. The grinding mill according to claim 8,
wherein
cross-sections of the second rotor milling projections comprise an evenly rising section and a convexly curved falling section.

11. The grinding mill according to claim 10,
wherein
the evenly rising section encloses, in the transition region to the base surface of the rotor, an angle ($\alpha$) with a tangent on the base surface, said angle being at most 90°, counting, with reference to a top view on a lower side of the rotor, counterclockwise away from the tangent on the base surface.

12. The grinding mill according to claim 10,
wherein
the convexly curved falling section spans, in a transition region to the base surface of the rotor, an angle (B) with a tangent on the base surface, said angle being at least 90°, but no more than 180°, counting, with reference to a top view on a lower side of the rotor, clockwise away from the tangent on the base surface.

13. The grinding mill according to claim 8,
wherein
the first rotor milling projections each have, in cross-section, a flat section and two opposing convexly curved flanks adjacent to the flat section.

14. The grinding mill according to claim 13,
wherein
the convexly curved flanks enclose, in a transition region between the convexly curved flanks and the base surface of the rotor, an angle of less than 90° with the base surface within the first rotor milling projections.

15. The grinding mill according to claim 1,
wherein
the milling projections of the rotor are skewed helically around a longitudinal axis of the rotor.

16. The grinding mill according to claim 1,
wherein
the rotor tapers conically from a lower side to an upper side.

17. The grinding mill according to claim 1,
wherein
a smallest curvature of the cross-sections of the milling projections has a radius of curvature in a range between 0.1 mm and 70 mm.

18. The grinding mill according to claim 1,
wherein
a smallest curvature of the cross-sections of the milling projections of the stator and/or of the rotor has a radius of curvature of at least 0.5 mm.

19. A seasoning grinder for grinding seasoning comprising:
a container for the seasoning, and
the grinding mill according to claim 1.

* * * * *